April 12, 1932. H. J. MURRAY 1,853,988
CONE TYPE SYNCHRONIZER FOR AXIALLY MOVABLE CLUTCHES
Filed July 12, 1926
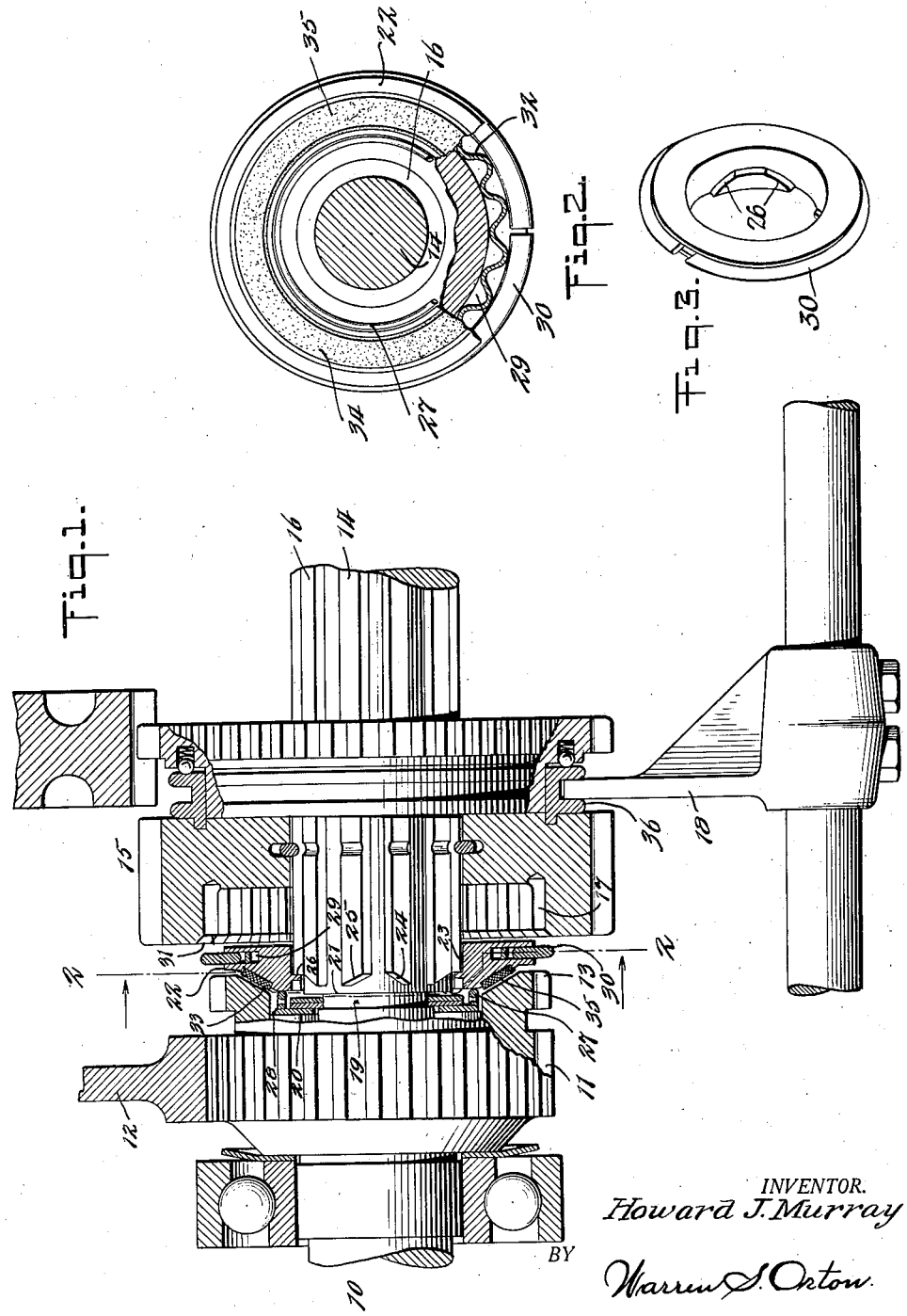
INVENTOR.
Howard J. Murray
BY
Warren S. Orton.
ATTORNEY.

Patented Apr. 12, 1932

1,853,988

UNITED STATES PATENT OFFICE

HOWARD J. MURRAY, OF BROOKLYN, NEW YORK, ASSIGNOR TO R. M. COMPANY, INC., OF EAST PITTSBURGH, PENNSYLVANIA, A CORPORATION OF DELAWARE

CONE TYPE SYNCHRONIZER FOR AXIALLY MOVABLE CLUTCHES

Application filed July 12, 1926. Serial No. 121,886.

REISSUED

The invention relates to a synchronizing device for causing a pair of clutch elements, gears or other power transmitting members to approach the same speed just prior to being moved into meshing or interdriving relation. The invention herein disclosed specifically relates to a synchronizing device for use in those situations where the clutches or gears to be synchronized are moved relative to each other along the same axis of rotation and as an illustration of one situation where a synchronizer of this character is particularly effective the invention will be described in connection with the coupling of the power shaft with the propeller shaft in the transmission casing of an automotive vehicle structure in effecting the usual direct driving relation.

The invention herein disclosed is an improvement in the device disclosed in Patent No. 1,579,728, granted April 6, 1926, in the device disclosed in application Serial No. 50,279 filed August 14, 1925, and is a companion case with application Serial No. 121,887 filed under even date.

In the above patent there is disclosed in connection with a showing of a conventional form of direct drive gear clutch, a synchronizer in the form of a ring or disk the periphery of which is defined by a split ring so disposed that when the beveled ends of the projections or teeth on the female element of the clutch are brought into bearing engagement with the split ring, it will react on the synchronizer to force the same into clutching engagement with the end of the main or male element of the clutch and in this way provide a frictional drive between the clutch elements just prior to their interengaging. In the patented showing the clutching faces are disposed in a plane perpendicular to the axis of rotation of the clutch members, and accordingly the clutching engagement is of no greater force than the force which is inherent in the control fork or other power actuated member which moves the female clutch element axially towards the coacting male element.

The primary object of the present improvement is to provide for a more powerful clutching action between the synchronizer and the member with which it frictionally engages than is possible with the showing in the patented form and at the same time to retain the advantages inherent in the structure shown in the patented form.

Broadly, this phase of the invention is attained by the utilizing of a cone form of friction clutch between the synchronizer and one of the clutch elements so that its engagement with its coacting member will be angularly disposed, instead of perpendicularly disposed to the axis of relative movement. In this way it is proposed to resolve the forces which act to shift the synchronizer axially into two components, one of which will provide for a powerfully acting frictional engagement between the synchronizer and its associated element with which it is designed to engage and at the same time to retain a structure which will permit the synchronizer normally to be free to rotate independently of the members to be synchronized until actually moved into operative position.

In the patented showing, the force for effecting the frictional clutching between the synchronizer and the male gear originated in the manually actuated shifting mechanism and of course was no greater than the manual force applied.

The present disclosure features a simplified means for effecting a powerful, mechanically actuated clutching action of the synchronizer with its coacting element independent of the force of the manual control and in this respect the disclosure constitutes another embodiment of the invention described and claimed in pending application Serial No. 614,502 filed January 23, 1923, and Serial No. 50,279 filed August 14, 1925.

Accordingly another object of the invention is to provide means particularly applicable where the clutch elements are in axial alignment for shifting the synchronizer into its clutching relation as an incident to the relative movement between the two elements whose speeds are being synchronized and for providing a form of connection by means of which the power for effecting the clutching action is derived from one of said elements.

Another object of the invention is to provide for the release of the synchronizer from its frictional clutching engagement automatically as the clutch elements are moved into their unclutched or inoperative relation.

Another object of the invention is to provide for the approximate centering of the split ring defining the periphery of the synchronizer in order to prevent accidental displacement of this ring from its associated slot.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

In the accompanying drawings,

Fig. 1 is a view largely in diagrammatic outline of parts of the conventional form of power transmission for attaining direct or high speed drive, equipped with a synchronizing device constituting a preferred embodiment of the invention;

Fig. 2 is a transverse sectional view through the synchronizer taken on the line 2—2 of Fig. 1 and looking in the direction indicated by the arrows and Figure 3 is a perspective view showing the cams for shifting the synchronizer.

In the following description and in the claims parts will be identified by specific names for convenience of expression but they are intended to be as generic in their application to similar parts as the art will permit and the detailed description follows the description in the above identified patent to show similarity of corresponding parts.

In the drawings there is shown the usual power shaft 10 for driving the main gear 11 and which drives the counter shaft (not shown) through the gear 12. The inner end 13 of the gear 11 also constitutes an axially fixed element of a mechanical clutch and will be referred to hereinafter as the driving or male clutch element or jaw. The propeller shaft 14 which aligns with the power shaft 10 is provided with a gear unit 15 keyed thereto and slidable axially along the splines 16 formed on the shaft 14.

The unit 15 includes a coacting clutch element 17 referred to hereinafter as the driven or female clutch element or jaw and into which telescopes the male element 13 as the unit 15 is shifted from right to left of the position shown in Fig. 1 by the controlling mechanism 18. The shaft 14 is provided with a reduced end 19 which extends axially into the gear 11. Antifriction devices 20 are positioned between the reduced end 19 and the inner periphery of the gear 11. The portion of the shaft 14 between the ends of the splines 16 and the reduced end 19 provides a smooth cylindrical bearing 21 at the end of the shaft 14 and between the gear 11 and the unit 15.

A synchronizer 22 is mounted on this smooth bearing portion 21 for both rotary and a slight freedom of axial movement. The synchronizer is in the form of a ring and will sometimes be referred to hereinafter as a clutch ring. The connection with the shaft 14 is conveniently attained by recessing the rear face of the ring to form an annular recess 23 into which extend the adjacent ends of the splines 16. The ends of the splines thus housed are inclined alternately in opposite directions so that adjacent splines have their ends beveled and facing each other to form cam faces 24 and 25 arranged in pairs circumferentially of the shaft. These cam faces are designed, when the synchronizer is in the position shown in Fig. 1, to engage against correspondingly shaped camming faces 26 defining the inner side of the recess 23.

The synchronizer is normally maintained in the position shown in Fig. 1 by means of a coiled seating spring 27 which bears on one side against the forward edge of the synchronizer and on its opposite side bears against the side plate 28 which forms part of the antifriction device 20. The clutch ring is provided with a peripheral groove 29 in which is mounted a split resilient ring 30. This ring is so proportioned that normally when in expanded position it projects radially out of the groove and beyond the peripheral outline of the clutch ring. When so positioned, the split ring is in the path of movement of the teeth forming the female element 17, the free ends of which teeth are shown beveled at 31 as is usual in such constructions. As this ring has a tendency to have its lower side drop out of the groove, it is herein suggested that there be positioned in the groove and within the outline of the spring a split, corrugated centering spring 32.

The present showing particularly distinguishes from the showing in the above identified patent in that the inner end of the main driving gear 11 is beveled to form a frusto-conical bearing face 33 and similarly the coacting face of the synchronizer ring is formed frusto-conical as shown at 34 and these faces are designed to provide a friction clutch of the cone type, in the instant case having an angle of (30) thirty degrees to a plane perpendicular to the axis of the shaft. Such a construction will give approximately twice the intensity of frictional engagement as compared to the frictional engagement with the flat faced form of friction clutch shown in the above identified patent. It is suggested in this embodiment of the invention that the interclutching surfaces be provided with a friction face herein indicated by a removable inset fabric ring 35 in this instance carried by the synchronizer ring rather than by the clutch element as shown in the patent.

In operation it will be understood that the movement of the control mechanism acting on the gear unit either directly or through the cam ring 36 more particularly identified in the copending applications will cause the clutch elements provided by the members 13 and 17 to be moved into and from interengaging position. It will be understood that as the gear unit is shifted to the left from the position shown in Fig. 1, it will bring the beveled ends on the teeth of the female element into bearing engagement with the split ring which at this time will function as a resilient stop and transmit the movement of the shiftable unit directly on to the shiftable clutch ring and, even in the absence of the cam shifting organization herein disclosed, will cause the clutch ring to be forced into clutching engagement with the conical end of the main gear. Considering the form of the disclosure which includes the spline cam face construction, the shiftable unit in its tendency to hold the synchronizer ring to its own speed which obviously would be different from the speed of the main drive gear the cam faces are caused to bear on the inclined faces of the synchronizer ring and thus tend to further force the synchronizer ring into its frictional engagement with the main gear. In either case there is thus provided a frictional drive between the gear 11 and the unit 15 and in this way there is effected a direct frictional drive between the shafts 10 and 14. As the unit 15 continues to move to the left it will act on the split ring and contract the same out of the path of movement of the shifting gear unit, and in this way permit the female element to telescope the synchronizing device and to move into direct clutching engagement with the male element as is usual in such constructions. The split ring 30 in its tendency to expand while telescoped by the unit 15 will bear on the teeth of the female clutch member 17 and thus assist in holding the jaws in their interclutching position.

In shifting the control fork 18 to the right in order to effect an unclutching of the elements there will be exerted sufficient force to overcome the locking effect of the split ring in its engagement with the teeth of the female clutch member. As the sliding unit is moved to the right away from the synchronizer the coiled seating spring 27 will react to shift the synchronizer as a whole towards the right and out of its frictional clutching engagement with the main drive gear and into position interlocked with the beveled ends of the splines.

At the end of the final shifting movement the parts will be restored into the position shown in Fig. 1 and the synchronizing parts will be automatically restored into position so as to become effective when the gear unit 15 is again shifted to effect an intermeshing between the member 13 and 17 forming the clutch.

By means of the improvement herein suggested it is possible to synchronize the speed of the clutch elements and cause a subsequent intermeshing without necessity of exerting anything more than a light movement of the controlling mechanism, where such mechanism is manually actuated, and the use of relatively weak machinery where the control mechanism is mechanically actuated. This is particularly true where, as in the illustrated showing, the power inherent in the inertia of the relatively movable clutch members to be synchronized is utilized for the purpose of effecting the synchronization.

Having thus described my invention, I claim:

1. In a transmission, the combination of a driving shaft provided with a main gear one end of which constitutes a clutch element and which end is recessed to provide a clutch face of a friction clutch of the cone type, a driven shaft having a reduced end extending axially into the main gear and provided with a longitudinally extending spline terminating in an inclined end to form a cam and said cam being in spaced relation to the reduced end to provide a cylindrical bearing surface, a gear unit slidable on said spline and provided with a coacting clutch element adapted to be moved in one direction into clutching engagement with the clutch element on the main gear, a synchronizer mounted for rotary movement on said cylindrical bearing surface, provided on one side with a frusto conical face adapted to engage in the recessed end of the main gear to provide the conical friction clutch, and provided on the other side with a plurality of faces inclined to the plane of rotation and adapted to coact with the cam at the end of the spline to effect a frictional engagement with the main gear, resilient means tending to move the synchronizer towards the cam on the spline and a control for shifting the unit into engagement with and past the synchronizer, and into clutching engagement with the main gear, and for causing the unit to shift the synchronizer circumferentially and thus cause the cam on the spline to shift the synchronizer axially and into clutching engagement with the main gear.

2. In a device of the class described, the combination of a pair of coacting clutch jaws coacting to form a male-female clutch having a common axis of rotation and movable axially relative to each other to and from an interdriving position, the bottom of the recess in the female jaw being flat, means between the jaws for causing them to approach the same speed before they assume said interdriving position, said means including a clutch element having an axial movement, the end of said clutch element facing the female jaw being flat and adapted to be intruded into the recess in the female jaw, the opposite end of the clutch element having a beveled clutching face coacting with a similarly beveled face on the male jaw to form a friction clutch therewith and camming means operatively connected to draw its power from the relative movement of the jaws and acting on the clutch element for shifting the same along said axis of rotation and at an angle to the beveled clutching faces for causing the friction clutch to become operative with a clutching intensity depending on the relative movement of the jaws, and a split ring constituting a retractile stop between the clutch element and the other jaw for transmitting axial movement from said other jaw to the clutch element.

3. In a device of the class described, the combination of a mechanical clutch including a pair of jaws having a common axis of rotation and movable axially relatively to each other to and from an interdriving position, means between the jaws normally disconnected from both jaws for causing them to approach the same speed before they assume said interdriving position, said means including a clutch element having an axial movement and having a conical clutch face inclined at an angle to said axial movement coacting with one of the jaws to form a clutch engagement along a curved surface inclined to the axis of movement, a retractile stop between the clutch element and the other jaw for transmitting axial movement from said other jaw to the clutch element and power means acting on the clutch element for moving the same towards said other jaw thereby to cause the clutch engagement to increase its effectiveness.

4. In a device of the class described, the combination of two members movable axially into driving relation, a synchronizer when actively disposed between the members tending to cause them to approach the same speed, said synchronizer including a conical face friction clutch element turning with one of the members and movable axially into face clutching engagement with the other member, a spring resisting said movement, a slip clutch connection between the clutch element and said other member and means for shifting the friction clutch element relative to both members firmly into clutching position.

5. In a device of the class described, the combination of a shaft, a clutch ring rotatably mounted on the shaft and having a slight freedom of movement into a clutching position means controlled by relative rotary movement between the shaft and ring for shifting the ring on the shaft, said clutch ring provided on one side with a frusto-conical face constituting a clutching face, a spring stop carried by the ring, normally projecting beyond the outlines thereof and a member shiftable on the shaft, adapted to engage said stop to cause the clutch ring to move into operative clutching position.

6. In a device of the class described, the combination of a pair of clutch elements mounted for relative axial movement to and from a clutching position, a synchronizer normally free from both of said members and adapted when actively disposed to cause the elements to approach the same speed prior to interengaging and means for forming a friction clutch of the cone type between the synchronizer and one of the clutch elements and camming means operatively responsive to the interengaging of the elements of said friction clutch for increasing such frictional interengaging.

7. In a device of the class described, the combination of a pair of elements constituting a mechanical clutch, a synchronizer for causing the elements to approach the same speed prior to interengaging, said synchronizer having a limited freedom of axial movement, a resilient slip clutch connection between the synchronizer and one of the elements normally in spaced relation to the synchronizer and dissociated therefrom, and a friction clutch between the synchronizer and the other element, said friction clutch provided with interengaging faces and means operatively controlled by the tendency of said faces to turn relative to each other following their initial interengaging for increasing the intensity of their engagement.

8. In a device of the class described, the combination of a driving shaft provided with a main gear fixed against axial movement and providing a friction clutch face on one end thereof inclined to the axis of rotation of the main gear and undercut at an angle of approximately 30° to a plane perpendicular to the axis of the shaft, a driven shaft in axial alignment with the driving shaft, a coacting unit keyed to the driven shaft and slidable axially thereon to and from a clutching engagement with the main gear, a synchronizer positioned between the main gear and unit for causing the shafts to approach the same speed prior to the interengaging of the main gear and unit, said synchronizer including a clutch element provided with a clutch face inclined to the axis of the main gear and underlapping the adjacent end of the main gear for frictionally engaging the inclined face on the main gear, and a resilient member disposed in the path of movement of the unit and adapted to be engaged thereby to clutch the unit with the clutch element and permit the unit in its advance to pass the synchronizer.

9. In a device of the class described, the combination of a driving shaft provided with an element of a mechanical clutch fixed against axial movement, and provided with a friction clutch face, a driven shaft provided with splines with their ends nearest the driving shaft beveled to form a plurality of circumferentially spaced cams, a coacting element of the mechanical clutch keyed by means of said splines to the driven shaft and slidable axially thereon to and from a mechanical clutching engagement, a synchronizer positioned between said elements of the mechanical clutch for causing them to approach a common speed prior to intermeshing, said synchronizer provided with a beveled face coacting with the first named clutch face to provide a conical type of friction clutch between the synchronizer and one of the elements, and means including said cams between the synchronizer and said other element for camming the synchronizer into its frictional engagement through said conical clutch.

10. In a device of the class described, the combination of a pair of clutch elements mounted for relative axial movement to and from a clutching position, an antifriction mounting for one of the elements, a synchronizer for causing the elements to approach the same speed prior to interengaging, said synchronizer provided with means coacting with one of the elements to provide a friction clutch, and provided with means coacting with the other element to provide a slip clutch, camming means between said last named element and the synchronizer for forcing the synchronizer into its frictional engagement with the coacting element, and a coiled cam reseating spring positioned between said antifriction mounting and the synchronizer.

11. In a device of the class described, the combination of a shaft provided with a spline having one end beveled to form a cam, and said shaft provided beyond the cam with a cylindrical bearing portion, a synchronizer rotatably mounted on said bearing portion, said synchronizer provided on the side facing the cam with a surface inclined to its plane of rotation and adapted to be engaged by the cam to shift the synchronizer axially on the shaft and into an operative position.

12. In a device of the class described, the combination of a pair of shafts axially aligned and each provided with an element of a mechanical clutch, one of said shafts provided with a spline on which one of said elements is slidably mounted, a synchronizer positioned between the elements for causing them to approach a common speed before moving into intermeshed relation, the end of the spline adjacent the other element being inclined in one direction from edge to edge, said incline forming a straight edge cam inclined to the plane of rotation of the elements and operatively disposed when the element on the spline is shifted axially to shift the synchronizer axially and into a frictional clutching engagement with the other element.

13. In a device of the class described, the combination of a gear fixed against axial movement, an antifriction mounting for said gear, a shaft extending axially relative to the main gear, a gear unit slidable on said shaft and adapted to be moved into intermeshed engagement with said fixed gear, a synchronizer between the fixed gear and the gear unit for causing them to approach a common speed, means for moving the synchronizer into a frictional clutching engagement with the fixed gear and a spring positioned between said antifriction mounting and the synchronizer tending to move the synchronizer in a reverse direction axially along the shaft and into unclutched position.

14. In a device of the class described, the combination of a clutch including a pair of jaws having a common axis of rotation and movable axially relative to each other to and from an interengaging position, means between the jaws for causing them to approach the same speed before they assume said interengaging position, said means including a clutch element having an axial movement and coacting with one of the jaws to form a friction clutch, said axially movable clutch element provided with an inset friction forming fabric ring, a spring stop carried by the clutch element, normally disposed in the path of movement of the other jaw and adapted to be engaged by said other jaw to move the clutch element into operative position, and means bearing on the clutch element for disengaging the friction clutch automatically when the jaws are moved into unclutching relation.

15. In a transmission, the combination of a driving shaft provided with a main gear one end of which constitutes a clutch jaw, a driven shaft extending axially of the main gear, a gear unit slidable on the driven shaft and including a coacting clutch jaw adapted to be moved in one direction into engagement with the main gear jaw, a clutch ring having a beveled end movable into clutching engagement with the adjacent end of the main gear, said clutch ring provided with a peripheral groove, a split ring positioned in said groove and normally projecting therefrom, means for centering the ring in its groove, said ring disposed in the path of movement of the gear unit as it is moved towards the main gear whereby the continued movement of the gear unit towards its clutching engagement with the main gear will shift the clutch ring into bearing engagement with the main gear and thus cause the shafts to approach the same speed prior to their interengaging through the jaws on the gear unit and main gear.

16. In a device of the class described, the combination of two members movable axially into driving relation, a synchronizer when actively disposed between the members tending to cause them to approach the same speed, said synchronizer including a retractile spring stop normally disposed in the path of relative axial movement of the members and adapted to provide a stop-clutch connection and a centering spring for locating said spring stop approximately concentric of the axis of rotation of the power members.

17. In a device of the class described, the combination of a mechanical clutch including a pair of jaws mounted for relative axial movement to and from an interdriving position, a synchronizer for causing the jaws to approach the same speed prior to interengaging, a split ring constituting a spring catch forming part of the synchronizer for securing the jaws in their interclutching position, and means for centering the split ring.

18. In a transmission, the combination of a driving shaft provided with a main gear, one end of which constitutes a clutch element, said end provided with a frusto-conical recess, a driven shaft extending axially of the main gear, a gear unit slidable on the driven shaft and provided with a coacting clutch element adapted to be moved in one direction into clutching engagement with the clutch element on the main gear, a clutch ring having a relatively wide inner perhiphery slidably mounted on one of the shafts having a slight freedom of axial movement into clutching engagement with the first named clutch element formed by the adjacent end of the main gear, said ring and the recess in the adjacent first named clutch element having their clutching faces fashioned to provide a friction clutch of the cone type, the outer periphery of said clutch ring being relatively narrow and provided with a peripheral groove, a split ring positioned in said groove and normally projecting therefrom; said ring disposed in the path of movement of the gear unit as it is moved towards the main gear whereby the continued movement of the gear unit towards its clutching engagement with the main gear will shift the clutch ring into frictional engagement with the main gear and thus cause the shafts to approach the same speed prior to their interengaging through the gear clutch elements.

19. In a synchronizing device, the combination of a shaft, a mechanical clutch including a male and female element, one keyed to the shaft and slidable thereon and the other mounted for rotary movement about its axis and fixed relative thereto, said elements adapted to be moved into interdriving relation, a ring synchronizer between the elements for causing them to approach the same speed before they are moved into their interdriving relation, said synchronizer having a slight freedom of movement axially relative to the clutch elements, and adapted to be contained entirely within the outlines of the female element when the elements are in interdriving relation, said synchronizer including a combined camming and clutch ring, said ring and shaft provided with camming means coacting to shift the synchronizer towards the fixed element, said synchronizer ring provided on its advance side with a conical friction face adapted to engage with the fixed element to form therewith a frictional clutch of the cone type, and said synchronizer ring adapted to be engaged by the shiftable element in its advance towards its mechanical clutching position to shift the ring synchronizer axially to cause a frictional clutching between the same and the fixed element through said cone type clutch thereby to cause the synchronizer to assume the speed of the fixed element and thus cause the camming means to function.

Signed at New York, in the county of New York, and State of New York, this seventh day of July A. D. 1926.

HOWARD J. MURRAY.